United States Patent
Muto (10) Patent No.: US 6,445,718 B1
(45) Date of Patent: Sep. 3, 2002

(54) SERIAL INTERFACE CIRCUIT

(75) Inventor: Takayasu Muto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/097,851

(22) Filed: Jun. 15, 1998

(30) Foreign Application Priority Data

Jun. 20, 1997 (JP) ............................................. 9-164811

(51) Int. Cl.$^7$ ..................... H04L 12/28; H04L 12/56; G06F 13/12; G06F 13/38; G06F 13/40
(52) U.S. Cl. ..................... 370/474; 370/257; 370/389; 370/395; 710/65; 710/74; 710/307; 710/315
(58) Field of Search ................. 370/389, 474, 370/475, 476, 498, 468, 464, 469; 710/307, 315, 20, 21, 22, 23, 62, 65

(56) References Cited

U.S. PATENT DOCUMENTS

| | | | | |
|---|---|---|---|---|
| 5,117,486 A | * | 5/1992 | Clark et al. .................. | 710/307 |
| 5,416,907 A | * | 5/1995 | Polzin et al. ................ | 395/275 |
| 5,799,209 A | * | 8/1998 | Chatter ........................ | 395/876 |
| 5,943,690 A | * | 8/1999 | Dorricott et al. ........... | 711/171 |
| 5,987,542 A | * | 11/1999 | Bang ............................ | 710/65 |
| 6,032,204 A | * | 2/2000 | Huff et al. .................... | 710/23 |
| 6,122,280 A | * | 9/2000 | Hamai et al. ................ | 370/395 |
| 6,128,316 A | * | 10/2000 | Takeda et al. .............. | 370/468 |
| 6,272,114 B1 | * | 8/2001 | Kobayashi ................... | 370/257 |

* cited by examiner

*Primary Examiner*—Wellington Chin
*Assistant Examiner*—M. Phan
(74) *Attorney, Agent, or Firm*—Frommer Lawrence & Haug LLP; William S. Frommer; Dennis M. Snid (57) ABSTRACT

A serial interface circuit capable of converting a large volume of data into packets based on a predetermined standard for transmission and reception and capable of performing smooth transmission and reception processing, configured so that, in a reception operation, a request packet generation circuit generates a request packet and calculates the maximum length of data of the response packet with respect to the request packet transmitted and a transaction controller compares the maximum length of data maxpl with the remaining memory amount of the response use FIFO and, when the remaining memory amount is larger than the maximum length of data, transmits the request packet. When the remaining memory amount is smaller than the maximum length of data maxpl, the output of the request packet to the link core, that is, the transmission of the request packet to the other node, is temporarily suspended until the remaining memory amount becomes larger than the maximum length of data maxpl.

16 Claims, 4 Drawing Sheets

SERIAL INTERFACE CIRCUIT

BACKGROUND OF THE INVENTION

1. Field of the Invention

The present invention relates to a digital serial interface circuit, more particularly relates to a serial interface circuit connected to a storage apparatus such as an HDD (hard disk drive), DVD (digital versatile disk)-ROM, CD (compact disk)-ROM, and tape streamer.

2. Description of the Related Art

In recent years, as an interface for transfer of multi-media data, the IEEE (The Institute of Electrical and Electronic Engineers) 1394 high performance serial bus for realizing high speed data transfer and real time transfer has become the standard.

In the data transfer by this IEEE 1394 serial interface, the transfer operation carried out in a network is referred to as a "sub-action". Two sub-actions are prescribed.

One is an asynchronous transfer mode for making conventional requests, requesting acknowledgment, and confirming reception, while the other is an isochronous transfer mode in which the data is always sent from a certain node one time in 125 μs.

In this way, the data at an IEEE 1394 serial interface having the two transfer modes is transferred in units of packets. In the IEEE 1394 standard, however, the smallest unit of data which is handled is a quadlet (=4 bytes=32 bits).

Figures 4A, 4B:
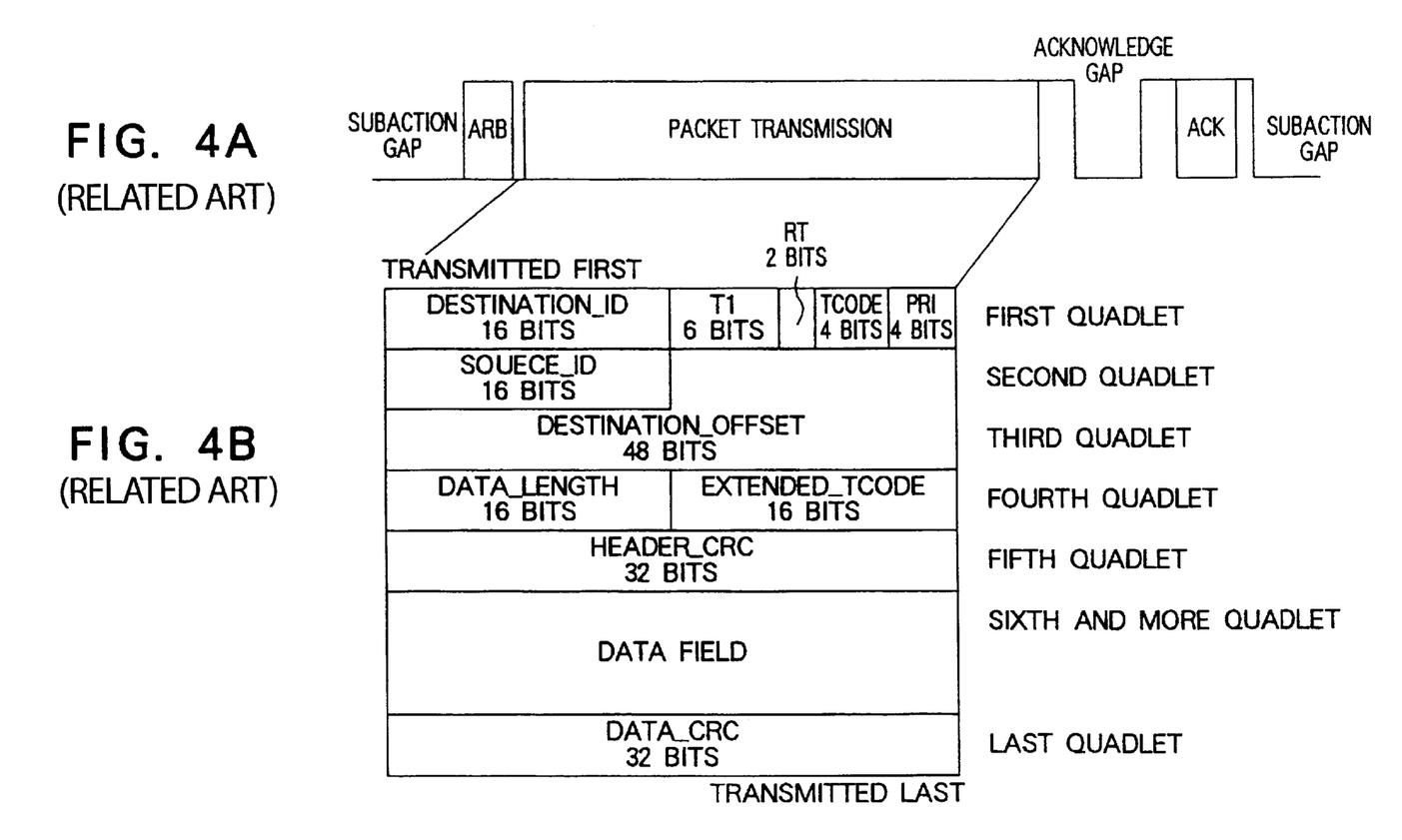
FIGS. 4A and 4B are views explaining an asynchronous transfer of the IEEE 1394 standard.

In the IEEE 1394 standard, usually the computer data is transferred by using the asynchronous transfer mode as shown in FIGS. 4A and 4B.

The asynchronous transfer mode, as shown in FIG. 4A, includes three transition states, that is, arbitration (arb) for securing the bus, packet transmission for transferring the data, and acknowledgment (ack).

The packet transmission is executed by the format as shown in FIG. 4B.

A first quadlet of the transfer packet is comprised of a destination ID region of 16 bits, a transaction label (tl) region of 6 bits, a retry code (rt) region of 2 bits, a transaction code (tcode) region of 4 bits, and a priority (pri) region of 4 bits.

The destination ID region indicates a bus no. and a node no. of this node, while the priority region indicates a priority level.

A second quadlet and a third quadlet are comprised by a source ID region of 16 bits and a destination offset region of 48 bits.

The source ID region indicates the node ID which sent the packet, while the destination offset region is comprised by a region of continuous highs and lows and indicates an address of an address space of the destination node.

A fourth quadlet is comprised by a data length region of 16 bits and an extended transaction code (extended tcode) region of 16 bits.

The data length region indicates the number of bytes of the received packet, while the extended tcode region is a region indicating an actual lock action carried out by the data of this packet where the tcode indicates a lock transaction.

A header CRC region added to the quadlet before the data field region is an error detection code of the packet header.

Further, the data CRC region added to the quadlet after the data region (data field) is the error detection code of the data field.

As explained above, in the usual transfer of computer data carried out in the asynchronous transfer mode, SBP-2 (Serial Bus Protocol-2) is used as the protocol.

According to this protocol, when data is transferred from a storage device, that is, a target, to a host computer, that is, an initiator, the transfer is carried out by writing the data from the storage device to a memory of the host computer. When data is transferred from the host computer to the target, the transfer is carried out by the storage device reading the data of the memory of the host computer.

However, no processing circuit system has yet been established for controlling a so-called "transaction layer" for converting the large volume of data to be stored in the storage device or read from the storage device into packets of the IEEE 1394 standard for transmission and reception.

SUMMARY OF THE INVENTION

An object of the present invention is to provide a serial interface circuit capable of converting a large volume of data into packets based on a predetermined standard for transmission and reception and of performing smooth transmission and reception processing.

To attain the above object, according to a first aspect of the present invention, there is provided a serial interface circuit for performing transmission and reception of an asynchronous packet between its own node and another node connected to its own node via a serial interface bus, comprising a storage means, a transmission packet generation circuit for generating a request packet containing a size of data to be transferred when transferring the data of the other node to its own node, a comparison means for comparing the size of data requested by the request packet and remaining amount of the storage means, and a data processing circuit which, when the result of the comparison of the comparison means is that the remaining amount of the storage means is larger than the requested size of data, transmits the request packet to the serial interface bus and which, when receiving a response packet with respect to the request packet from the other node, stores at least a data portion of the response packet in the storage means.

According to a second aspect of the present invention, there is provided a serial interface circuit for performing transmission and reception of an asynchronous packet between its own node and another node connected to its own node via a serial interface bus, comprising a first storage means, a second storage means, a transmission packet generation circuit for generating a request packet containing a size of data to be transferred and storing the same in the first storage means when transferring the data of the other node to its own node, a comparison means for comparing the size of data requested by the request packet and remaining amount of the second storage means, and a data processing circuit which, when the result of the comparison of the comparison means is that the remaining amount of the second storage means is larger than the requested size of data, transmits the request packet to the serial interface bus and which, when receiving a response packet with respect to the request packet from the other node, stores at least a data portion of the response packet in the second storage means.

According to a third aspect of the present invention, there is provided a serial interface circuit for performing transmission and reception of an asynchronous packet between its own node and another node connected to its own node via a serial interface bus, comprising a storage means, a transmission packet generation circuit for generating a request packet containing a size of data to be transferred when transferring the data of the other node to its own node, a maximum size calculating circuit for obtaining a maximum size of data which can be requested by the request packet, a comparison means for comparing the maximum size of data obtained by the maximum size calculating circuit and remaining amount of the storage means, and a data processing circuit which, when the result of the comparison of the comparison means is that the remaining amount of the storage means is larger than the maximum size of data, transmits the request packet to the serial interface bus and which, when receiving a response packet with respect to the request packet from the other node, stores at least the data portion of the response packet in the storage means.

According to a fourth aspect of the present invention, there is provided a serial interface circuit for performing transmission and reception of an asynchronous packet between its own node and another node connected to its own node via a serial interface bus, comprising a first storage means, a second storage means, a transmission packet generation circuit for generating a request packet containing a size of data to be transferred and storing the same in the first storage means when transferring the data of the other node to its own node, a maximum size calculating circuit for obtaining a maximum size of data which can be requested by the request packet, a comparison means for comparing the maximum size of data obtained by the maximum size calculating circuit and remaining amount of the second storage means, and a data processing circuit which, when the result of the comparison of the comparison means is that the remaining amount of the second storage means is larger than the maximum size of data, transmits the request packet to the serial interface bus and which, when receiving a response packet with respect to the request packet from the other node, stores at least a data portion of the response packet in the second storage means.

Preferably, in the above aspects, the transmission packet generation circuit, when transferring data of the other node to its own node, generates a plurality of request packets containing the size of data to be transferred and transmits the same to the serial interface bus to enable transfer of the data in packets.

Alternatively, in the above aspects, the transmission packet generation circuit, when transferring data of the other node to its own node, generates a plurality of request packets containing the size of data to be transferred and transmits the same to the serial interface bus to enable transfer of the data in packets.

According to the circuit of the present invention when transferring data from another node to its own node, the request packet containing the size of the data to be transferred is generated by the transmission packet generating circuit and is input to the data processing circuit (or stored in the first storage means).

In the comparison means, the size of the data requested by the request packet and the remaining amount of the storage means (or the second storage means) are compared.

When the result of the comparison is that the remaining amount of the storage (or the second storage means) is larger than the size of the requested data, the request packet is transmitted from the data processing circuit to the serial interface circuit.

When the response packet with respect to the request packet from another node is received, at least the data portion of the response packet is stored in the storage means (or the second storage means).

Further, according to the circuit of the present invention, when transferring data from another node to its own node, a request packet containing the size of the data to be transferred to enable transfer of the data in packets is generated and is input to the data processing circuit (or stored in the first storage means).

In the maximum size calculating circuit, the maximum size of the data requested by the request packet is obtained and is input to the comparison means.

In the comparison means, the maximum size of the data and the remaining amount of the storage means (or the second storage means) are compared.

When the result of the comparison is that the remaining amount of the storage means (or the second storage means) is larger than the maximum size of data, the request packet is transmitted from the data processing circuit to the serial interface circuit.

When a request packet with respect to the response packet from another node is received, at least the data portion of the response packet is stored in the storage means (or the second storage means).

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, preferred embodiments will be described with reference to the accompanying drawings.

Figure 1:
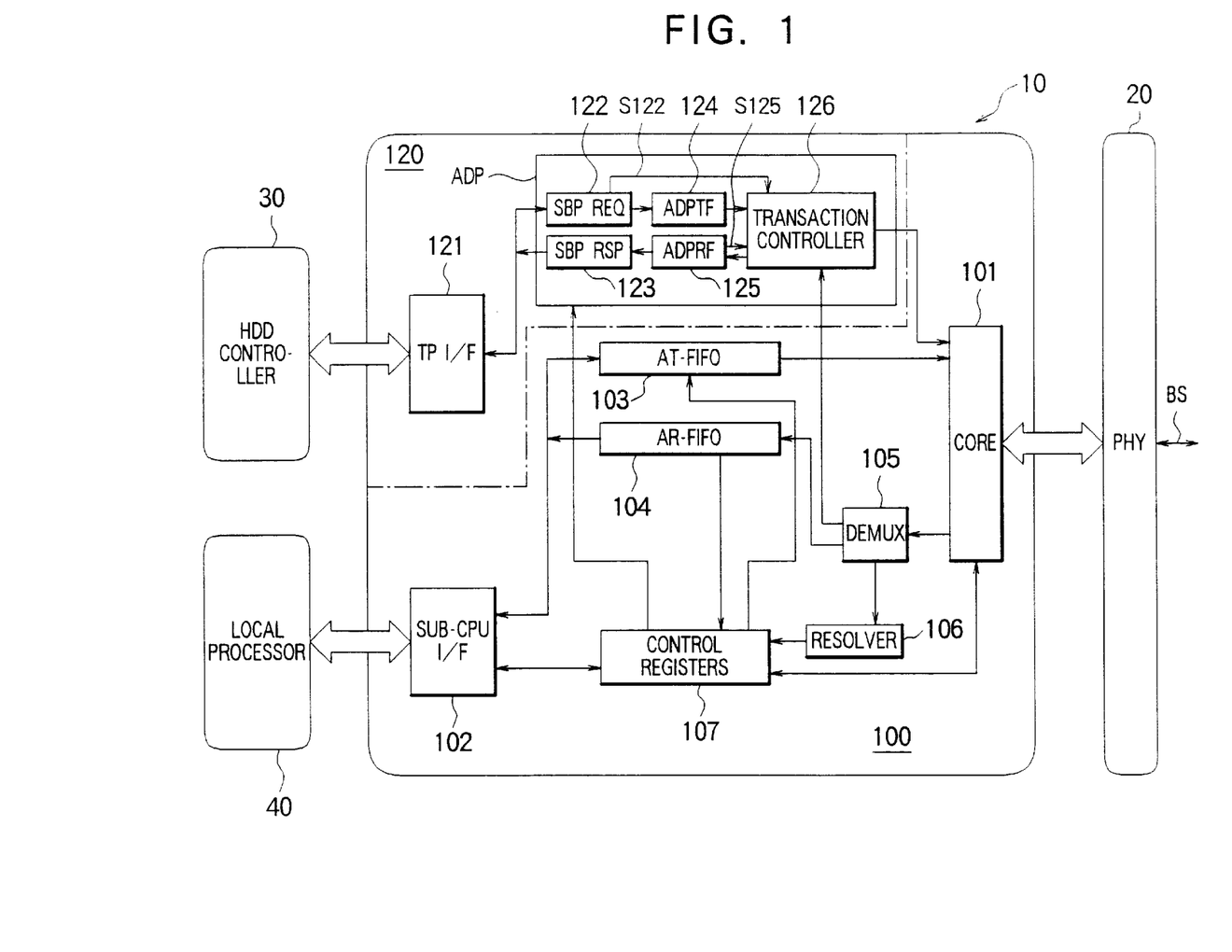
FIG. 1 is a block diagram of the configuration of a first embodiment of an IEEE 1394 serial interface circuit according to the present invention.

FIG. 1 is a block diagram of the configuration of a first embodiment of an IEEE 1394 serial interface circuit according to the present invention.

Note that this serial interface circuit is configured to perform the transfer of computer data handled in asynchronous communication. For this reason, in FIG. 1, the concrete configuration of the isochronous communication side circuit is not illustrated.

This serial interface circuit is constituted by a link/transaction layer integrated circuit 10, a physical layer circuit 20, a controller 30 of a not illustrated hard disk drive (HDD) serving as the storage device, and a local processor 40 serving as the host computer.

The link/transaction layer integrated circuit 10 is constituted by integration of a link layer circuit 100 and a transaction layer circuit 120 and performs the control of the asynchronous transfer and the control of the physical layer circuit 20 under the control of the local processor 40.

The link layer circuit 100 is constituted by, as shown in FIG. 1, a link core 101, a CPU interface circuit (Sub-CPU I/F) 102, a transmission use FIFO (AT-FIFO: First-In First-Out) 103 used in asynchronous communication 103, a reception use FIFO (AR-FIFO) 104 used in asynchronous communication, a demultiplexing circuit (DeMux) 105 for discriminating a received packet, a self ID use resolver 106, and a control register (hereinafter referred to as a CR) 107.

The link core 101 is constituted by a transmission circuit for an asynchronous communication use packet and isochronous communication use packet through which commands and computer data are transferred, a reception circuit, an interface circuit with the physical layer circuit 20 for directly driving the IEEE 1394 serial bus BS of these packets, a cycle timer reset at every 125 μs, a cycle monitor, and a CRC circuit.

It performs the transmission processing etc. of the computer data read from the not illustrated hard disk and formed into predetermined transmission packets at the transaction layer circuit 120.

For example, when it receives notification that there is data to be transmitted from the transaction controller 126 of a transaction layer circuit 120, which will be explained later, it carries out arbitration for the 1394 serial bus via the physical layer circuit 20 to secure the bus.

Note that, in FIG. 1, as mentioned above, the FIFO etc. of the isochronous communication side are omitted.

The CPU interface circuit 102 performs arbitration of writing, reading, etc. of the asynchronous communication use packets between the local processor 40 and the transmission use FIFO 103 and the reception use FIFO 104 and arbitration of transmission and reception of various data between the local processor 40 and the CR 107.

For example, it transmits the control use commands of the hard disk serving as the storage device which are transmitted from the host computer serving as the initiator through the IEEE 1394 interface bus BS and stored in the reception use FIFO to the local processor 40. The data for starting up the transaction layer circuit 120 for transmitting and receiving the computer data is set from the local processor 40 in the CR 107 through the CPU interface circuit 102.

Furthermore, during a read (receiving) operation for transferring data from another node to its own node in the transaction layer circuit 120, 4-bit maximum length data (max-payload) for designating the maximum length of data for calculating the maximum length of data of the response packet is set from the local processor 40 to the CR 107 via the CPU interface circuit 102.

The maximum length data is sent to a request packet generation circuit 122, explained below, in the transaction layer circuit 120.

The transmission use FIFO 103 stores an asynchronous communication use packet to be transmitted to the IEEE 1394 serial bus BS. The stored data is given to the link core 101.

Further, the reception use FIFO 104 stores an asynchronous communication use packet transmitted through the IEEE 1394 serial bus, for example, the control use commands etc. of the hard disk serving as the storage device, by the demultiplexing circuit 105.

The demultiplexing circuit 105 checks the transaction code tcode and the transaction label tl located in the first quadlet of the asynchronous communications packet via the link core 101, discriminates if this is a response packet from the initiator, that is, host computer, to the target, that is, transaction layer circuit, or another packet, inputs only the response packet to the transaction layer circuit 120, and stores other packets in the reception use FIFO 104.

Note that, the transaction label tl used for the discrimination check is commonly set to "a". As the tcode (transaction code), different data are set according to whether it is a write request and response or a read request and response.

More specifically, the tcode is set to "0" in the case of a write request and quadlet write, while is set to "1" in the case of a block write.

Further, it is set to "2" in the case of a write response.

In the case of a read request and quadlet read, it is set to "4", and in the case of a block read, it is set to "5"

Further, in the case of a read response, it is set to "6/7".

The resolver 106 analyzes the self ID packet transmitted through the IEEE 1394 serial bus BS and stores this in the CR 107. Further, this has also the functions of checking for errors, counting the number of nodes, etc.

The transaction layer circuit 120 has the function of automatically transmitting and receiving the data of computer peripherals (hard disk drives in the present embodiment) as asynchronous packets based on the SBP-2 (Serial Bus Protocol-2) standard.

Further, the transaction layer circuit 120 is provided with a retry function and a split timeout detection function.

The retry function is a function of retransmitting the corresponding request packet where an "ack busy*" Ack code is returned after transmitting a request packet. When the packet is retransmitted, the transmission is performed after setting the rt region of 2 bits located in the first quadlet of the transmission packet from "00" to "01".

The split timeout detection function is a function for detecting when the time for the return of the response packet runs out.

This transaction layer circuit 120 is constituted by a transport data interface circuit 121, a request packet generation circuit (SBPreq) 122, a response packet decode circuit (SBPRsp) 123, a request use FIFO (Request FIFO: ADPTF) 124, a response use FIFO (Response FIFO: ADPRF) 125, and a transaction controller 126.

A data processing circuit ADP is constituted by the request packet generation circuit (SBPreq) 122, response packet decode circuit (SBPRsp) 123, request use FIFO (Request FIFO: ADPTF) 124, response use FIFO (Response FIFO: ADPRF) 125, and the transaction controller 126.

The transport data interface circuit 121 performs arbitration of transmission and reception of data between the HDD controller 30 and the request packet generation circuit 122 and the response packet decode circuit 123.

When receiving an instruction for startup of the data transfer from the CR 107 of the link layer circuit 100, in the case of transmission (writing), the request packet generation circuit 122 divides the computer data recorded on a not illustrated hard disk, obtained via the transport data interface circuit 121, according to the SBP-2 standard into one or more blocks of data so that it can be divided into packets, adds a 1394 header designating the transaction label tl (=a), and stores the same in the request use FIFO 122.

Further, in the case of reception (reading), it forms the 1394 block read request command of the designated address and data length into a packet having a data length by designating one or more transaction labels tl (=a) or the like according to the SBP-2 standard and stores the same in the request use FIFO 124.

Furthermore, during the above reception, it receives the maximum length data max-payload designated by the CR 107, calculates the maximum length of data of the response packet with respect to the request packet to be transmitted, and outputs a 12-bit signal S122 indicating the maximum length of data (byte) maxpl to the transaction controller 126.

The maximum length of data (byte) maxpl can be obtained from the following formula:

$$\text{maxpl} = 2^{(max\_payload+2)}$$

The response packet decode circuit 123 reads the response packet data stored in the response use FIFO 125 at the time of reception, removes the 1394 header from the response packet, and outputs the read data via the transport data interface circuit 121 to the HDD controller 30 at a predetermined timing.

The request use FIFO 124, in the case of transmission (writing), stores the transmission data divided into packets and, in the case of reception (reading), stores the 1394 block read request command.

Note that the request use FIFO 124, in the case of storing the data to be transmitted, outputs an active signal EMT indicating that effect at, for example, the low level "0", to the transaction controller 126.

The response use FIFO 125, in the case of reception (reading), stores the received data transmitted from the host computer side through the 1394 serial bus BS.

Note that the response use FIFO outputs a signal S125 indicating the remaining amount of the memory to the transaction controller 126.

The transaction controller 126 reads the transmission data divided into packets stored in the request use FIFO 124 at the time of transmission and the 1394 block read request command (request packet) stored in the request use FIFO 124 at the time of reception and controls the output to the link core 101 of the link layer circuit 100.

Further, at the time of reception, it compares the maximum length of data (byte) maxpl given by the received signal S122 from the request packet generation circuit 122 with the remaining memory amount of the response use FIFO 125 indicated by the received signal S125 from the response use FIFO 125. When the result is that the remaining memory amount is more than the maximum length of data maxpl, it outputs the request packet to the link core 101. The request packet is then transmitted by the link core 101.

On the other hand, when the remaining memory amount is less than the maximum length of data maxpl, since the data length of the response packet to be transmitted in response to the request of the request packet transmitted is larger than the remaining memory amount and it is feared that already stored data of the response use FIFO 125 might be destroyed, the output of the request packet to the link core will be suspended until the remaining memory amount becomes larger than the maximum length of data maxpl. Namely, the transmission of the request packet to the other node will be temporarily stopped.

Further, at the time of transmission, upon receipt of a response packet from the demultiplexing circuit 105 of the link layer circuit 100, the retry code rcode thereof is written into the CR 107. At the time of reception, the response packet from the demultiplexing circuit 105 is stored in the response use FIFO 125.

Next, an explanation will be given of the transmission and reception operations of computer data when packets determined by the SBP-2 standard are transferred in the above configuration.

First, an explanation will be given of the transmission operation, that is, a case when the data is transferred from the target, that is, hard disk, to the initiator, that is, host computer, and when the operation of writing the data into the memory of the host computer from the storage device (hard disk) is carried out.

The packet data such as the ORB (operation request block) based on the SBP-2 standard transferred from the host computer through the 1394 serial bus BS is input to the demultiplexing circuit 105 via the physical layer circuit 20 and the link core 101 of the link layer circuit 100.

The demultiplexing circuit 105, upon receipt of the received packet, discriminates whether the packet is a response packet with respect to the target, that is, transaction layer circuit, from the host computer or another packet.

Then, in this case, since it is another packet, the received data is stored in the reception use FIFO 104.

The received data such as ORB stored in the reception use FIFO 104 is input to the local processor 40 via the CPU interface circuit 102.

The local processor 40 initializes the transaction layer circuit use register of the CR 107 according to the contents of the ORB via the CPU interface circuit 102.

By this, the transaction layer circuit 120 is started up.

In the started up transaction layer circuit 120, the request packet generation circuit 122 starts to request data to the HDD controller 30 via the transport data interface circuit 121.

According to the request, the transmission data sent via the transport data interface circuit 121 is divided into one or more blocks of data so that it can be divided into packets according to the SBP-2 standard in the request packet generation circuit 122. A 1394 header having a designated transaction label t1 (=a) or the like is added and the result is automatically stored in the request use FIFO 124.

When data of one 1394 packet size or more is stored in the request use FIFO 124, the data is sent to the link core 101 of the link layer circuit 100 by the transaction controller 126.

Then, the link core 101 applies arbitration to the 1394 serial bus BS via the physical layer circuit 20.

By this, if the bus can be secured, a write request packet containing the transfer data is transmitted to the host computer via the physical layer circuit 20 and the 1394 serial bus BS.

After transmission, an Ack code with respect to the write request packet and, in certain cases, the write response packet is sent from the host computer and input to the demultiplexing circuit 105 via the physical layer circuit 20 and the link core 101 of the link layer circuit 100.

In the demultiplexing circuit 105, a check of the transaction code tcode and the transaction label t1 of the received packet is carried out, and when it is discriminated that the received packet is the response packet with respect to the transaction layer circuit as the target from the host computer, the response packet is input to the transaction controller 126 of the transaction layer circuit 120.

The transaction controller 126 transmits the next data to the link core 101 if the Ack code and the response code of the input response packet are normal.

The above operation is repeated to write (transmit) the computer data to the memory of the host computer.

Figure 2:
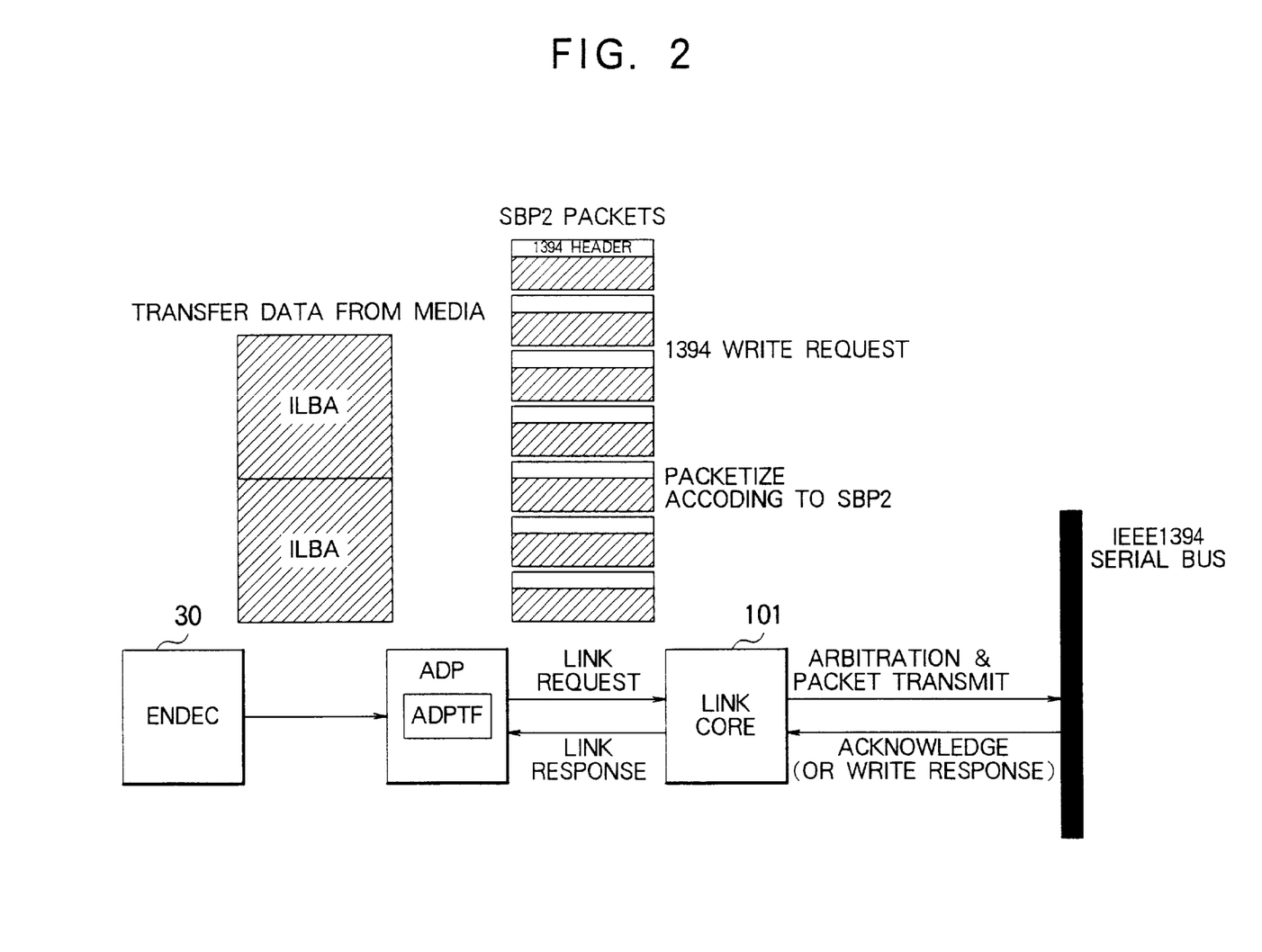
FIG. 2 is a view showing in brief a transmission operation in a transaction layer circuit according to the present invention.

An outline of the operation of the transaction layer circuit 120 in the above transmission is shown in FIG. 2.

Next, an explanation will be given of the reception operation, that is, a case when transferring data from the host computer to the target and when the storage device (hard disk) performs the operation for reading the data of the memory of the host computer.

The packet data such as the ORB based on the SBP-2 standard transferred from the host computer through the 1394 serial bus BS is input to the demultiplexing circuit 105 via the physical layer circuit 20 and the link core 101 of the link layer circuit 100.

The demultiplexing circuit 105 receives the received packet and discriminates whether the received packet is a response packet with respect to the target, that is, transaction layer circuit, from the host computer or another packet.

Then, in this case, since the received packet is another packet, the received data is stored in the reception use FIFO 104.

The received data such as the ORB stored in the reception use FIFO 104 is input to the local processor 40 via the CPU interface circuit 102.

The local processor 40 initializes the transaction layer circuit use register of the CR 107 according to the content of the ORB via the CPU interface circuit 102.

By this, the transaction layer circuit 120 is started up.

In parallel with the initializing, the 4-bit maximum length data (max-payload) for designating the maximum length of data for calculating the maximum length of data in the response packet designated by the request packet is set from the local processor 40 to the CR 107 via the CPU interface circuit 102.

The maximum length data is supplied to the request packet generation circuit 122 of the transaction layer 120.

In the activated transaction layer circuit 120, the request packet generation circuit 122 forms the 1394 block read request command of the designated address and data length into a packet according to the SBP-2 standard and stores the same in the request use FIFO 124.

Furthermore, the request packet generation circuit 122 receives the maximum length data max-payload designated by the CR 107, calculates the maximum length of data of the response packet with respect to the request packet to be transmitted, and outputs the 12-bit signal S122 indicating the maximum length of data (byte) maxpl to the transaction controller 126.

The transaction controller 126 compares the maximum length of data maxpl given by the received signal S122 from the request packet generation circuit 122 and the remaining memory amount of the response use FIFO 125 indicated by the received signal S125 from the response use FIFO 125.

When the result of the comparison is that the remaining memory amount is larger than the maximum length of data maxpl, the request packet is output to the link core 101.

On the other hand, when the remaining memory amount is less than the maximum length of data maxpl, since the data length of the response packet to be transmitted in response to the request of the request packet to be transmitted is larger than the remaining memory amount and it is feared that already stored data of the response use FIFO 125 might be destroyed, the output of the request packet to the link core will be suspended until the remaining memory amount becomes larger than the maximum length of data maxpl. Namely, the transmission of the request packet to the other node will be temporarily stopped.

As mentioned above, when the remaining memory amount is larger than the maximum length of data maxpl, the read request command packet stored in the request use FIFO 124 is sent to the link core 101 of the link layer circuit 100 by the transaction controller 126.

Then, the link core 101 applies arbitration to the 1394 serial bus BS via the physical layer circuit 20.

By this, when the bus can be secured, the read request packet is transmitted to the host computer via the physical layer circuit 20 and the 1394 serial bus BS.

After transmission, an Ack code with respect to the read request packet and the read response packet containing the data of the designated data length are sent from the host computer and input to the demultiplexing circuit 105 via the physical layer circuit 20 and the link core 101 of the link layer circuit 100.

The demultiplexing circuit 105 checks the transaction code tcode and the transaction label t1 of the received packet. When it determines that the received packet is a response packet with respect to the target, that is, the transaction layer circuit, from the host computer, it inputs the response packet to the transaction controller 126 of the transaction layer circuit 120.

The transaction controller 126 stores the response packet data from the demultiplexing circuit 105 in the response use FIFO 125.

The data stored in the response use FIFO 125 is read by the response packet decode circuit 123, the 1394 header is removed, and the resultant data is output to the HDD controller 30 via the transport data interface circuit 121 at a predetermined timing.

The above operation is repeated to write (receive) the computer data to the storage device (hard disk).

Figure 3:
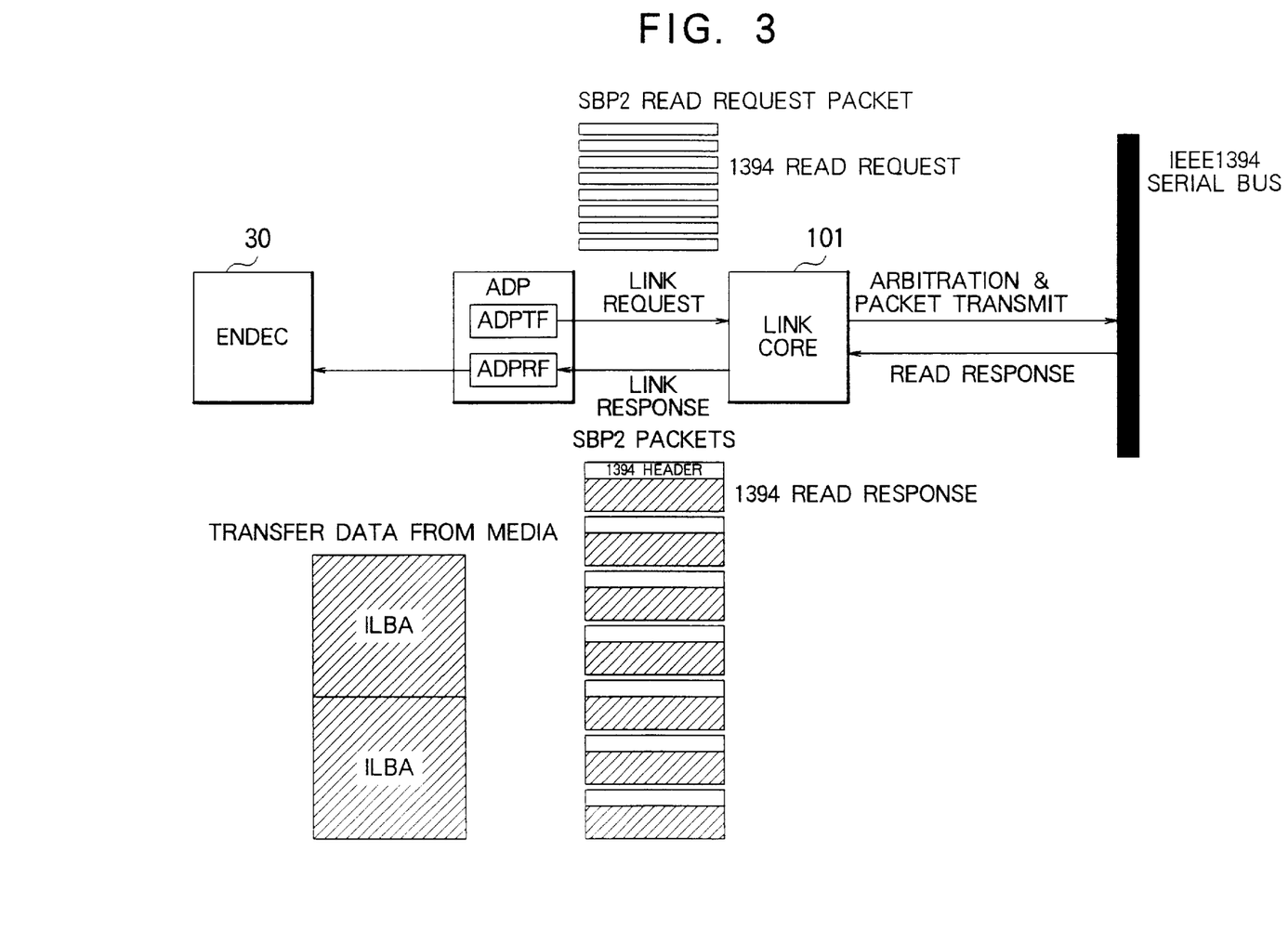
FIG. 3 is a view showing in brief a reception operation in a transaction layer circuit according to the present invention.

An outline of the operation of the transaction layer circuit 129 in the above reception is shown in FIG. 3.

As explained above, according to the first embodiment, since provision is made of a transaction layer circuit 120 serving as a data processing circuit to which a storage device is connected, which reads data of the storage device, adds a self-designating transaction label, and transmits the data as a transmission asynchronous packet to a serial interface bus BS and, when transferring data of another node to the storage device, generates a request packet to which it had added a self-designating label and transmits the same to the serial interface bus BS, receives a response packet for this request packet from the other node, takes out a data portion from the response packet, and transfers this to the storage device, it is possible to transmit and receive a large volume of data stored in the storage device or read from the storage device in IEEE 1394 packets based on the SBP-2 standard and possible to realize large volume data transfer by using IEEE 1394 serial bus interface asynchronous packets.

Further, the sequence based on the SBP-2 standard of fetching the ORB, transferring the data, and transmitting the status to the initiator can be simplified and optimum design becomes possible when connecting a disk driver, tape streamer, or other computer peripheral to an IEEE 1394 serial bus.

Further, at the time of a reception operation, the request packet generation circuit 122 generates the request packet, calculates the maximum length of data of the response packet with respect to the request packet to be transmitted, and outputs the calculated result as the signal S122 to the transaction controller 126. It also compares the maximum length of data maxpl given by the received signal S122 from the request packet generation circuit 122 with the remaining memory amount of the response use FIFO which is indicated by the received signal S125 from the response use FIFO 125 and, when the remaining memory amount is larger than the maximum length of data maxpl, instructs the transmission of the request packet. When the remaining memory amount is less than the maximum length of data maxpl, since the length of data of the response packet to be transmitted in response to the request of the request packet transmitted is larger than the remaining memory amount and it is feared that already stored data of the response use FIFO 125 might be destroyed, the output of the request packet to the link core is suspended until the remaining memory amount becomes larger than the maximum length of data maxpl. Namely, the transmission of the request packet to the other node is temporarily stopped. As a result, there is an advantage that it is possible to secure a sufficient space in the reception use FIFO to receive a response packet with respect to a request packet transmitted by its own node.

Further, since the request use FIFO 124 and the response use FIFO 125 are provided in the transaction layer circuit 120 and the transmission use FIFO 103 and the reception use FIFO 104 are provided in the link layer circuit 100, the transmission and reception of usual 1394 packets other than data can be carried out in parallel to the transfer of data by the request use FIFO 124 and the response use FIFO 125.

Further, since provision is made of the demultiplexing circuit 105 which checks the transaction code tcode and the transaction label t1 located in the first quadlet of the asynchronous communications packet via the link core 101, discriminates whether the received packet is a response packet with respect to the target, that is, the transaction layer circuit, from the initiator, that is, the host computer, or another packet, inputs only the response packet to the transaction layer circuit 120, and stores the other packets in the reception use FIFO 104, even if a critical error occurs at for example the transaction layer circuit 120 side and the read/write operation of data stops, there is the advantage that reading of the commands input after the data will not become impossible and therefore that commands can be smoothly received regardless of the state of the read/write operation of the data.

Note that while the above embodiment is configured so as to calculate, at the time of reception, the maximum length of data of the response packet with respect to the request packet transmitted, compare the obtained maximum length of data maxpl with the remaining memory amount of the response use FIFO 125 which is indicated by the received signal S125 from the response use FIFO 125, and determine whether to transmit the request packet or stop for a while, it is also possible to configure it so as, for example, to read the data length data DL contained in the request packet by the transaction controller 126, compare the data length data DL with the remaining memory amount of the response use FIFO 125 for each request packet, and determine whether to transmit the request or stop for a while.

The same effects can be obtained as explained above in the above configuration as well.

As explained above, according to the present invention, a serial interface circuit capable of converting a large volume of data into packets based on a predetermined standard for transmission and reception and capable of performing smooth transmission and reception processing can be realized.

Further, there is an advantage that it is possible to secure a sufficient space in the reception use FIFO to receive a response packet with respect to a request packet transmitted by its own node.

While the invention has been described with reference to specific embodiment chosen for purpose of illustration, it should be apparent that numerous modifications could be made thereto by those skilled in the art without departing from the basic concept and scope of the invention.

What is claimed is:

1. A serial interface circuit for performing transmission and reception of an asynchronous packet between its own node and another node connected to its own node via a serial interface bus, comprising:

a storage means for storing data;

a transmission packet generation circuit for generating a request packet containing a size of data to be transferred when transferring the data of the other node to its own node, a comparison means for comparing the size of data requested by the request packet and remaining amount of the storage means, and a data processing circuit which, when the result of the comparison of the comparison means is that the remaining amount of the storage means is larger than the requested size of data, transmits the request packet to the serial interface bus and which, when receiving a response packet with respect to the request packet from the other node, stores at least the data portion of the response packet in the storage means.

2. A serial interface circuit for performing transmission and reception of an asynchronous packet between its own node and another node connected to its own node via a serial interface bus, comprising:

a first storage means for storing data, a second storage means for storing data, a transmission packet generation circuit for generating a request packet containing a size of data to be transferred and storing the same in the first storage means when transferring the data of the other node to its own node, a comparison means for comparing the size of data requested by the request packet and remaining amount of the second storage means, and a data processing circuit which, when the result of the comparison of the comparison means is that the remaining amount of the second storage means is larger than the requested size of data, transmits the request packet to the serial interface bus and which, when receiving a response packet with respect to the request packet from the other node, stores at least the data portion of the response packet in the second storage means.

3. A serial interface circuit as set forth in claim 1, wherein the transmission packet generation circuit, when transferring data of the other node to its own node, generates a plurality of request packets containing the size of data to be transferred and transmits the same to the serial interface bus to enable transfer of the data in packets.

4. A serial interface circuit as set forth in claim 2, wherein the transmission packet generation circuit, when transferring data of the other node to its own node, generates a plurality of request packets containing the size of data to be transferred and transmits the same to the serial interface bus to enable transfer of the data in packets.

5. A serial interface circuit for performing transmission and reception of an asynchronous packet between its own node and another node connected to its own node via a serial interface bus, comprising:

a storage means for storing data, a transmission packet generation circuit for generating a request packet containing a size of data to be transferred when transferring the data of the other node to its own node, a maximum size calculating circuit for obtaining a maximum size of data which can be requested by the request packet, a comparison means for comparing the maximum size of data obtained by the maximum size calculating circuit and remaining amount of the storage means, and a data processing circuit which, when the result of the comparison of the comparison means is that the remaining amount of the storage means is larger than the maximum size of data, transmits the request packet to the serial interface bus and which, when receiving a response packet with respect to the request packet from the other node, stores at least the data portion of the response packet in the storage means.

6. A serial interface circuit for performing transmission and reception of an asynchronous packet between its own node and another node connected to its own node via a serial interface bus, comprising:

a first storage means for storing data;

a second storage means for storing data;

a transmission packet generation circuit for generating a request packet containing a size of data to be transferred and storing the same in the first storage means when transferring the data of the other node to its own node, a maximum size calculating circuit for obtaining a maximum size of data which can be requested by the request packet, a comparison means for comparing the maximum size of data obtained by the maximum size calculating circuit and remaining amount of the second storage means, and a data processing circuit which, when the result of the comparison of the comparison means is that the remaining amount of the second storage means is larger than the maximum size of data, transmits the request packet to the serial interface bus and which, when receiving a response packet with respect to the request packet from the other node, stores at least the data portion of the response packet in the second storage means.

7. A serial interface circuit as set forth in claim 5, wherein the transmission packet generation circuit, when transferring data of the other node to its own node, generates a plurality of request packets containing the size of data to be transferred and transmits the same to the serial interface bus to enable transfer of the data in packets.

8. A serial interface circuit as set forth in claim 6, wherein the transmission packet generation circuit, when transferring data of the other node to its own node, generates a plurality of request packets containing the size of data to be transferred and transmits the same to the serial interface bus to enable transfer of the data in packets.

9. A serial interface circuit for performing transmission and reception of an asynchronous packet between its own node and another node connected to its own node via a serial interface bus, comprising:

a storage device;

a transmission packet generation circuit;

a comparison circuit arranged to receive outputs from the storage device and the transmission packet generation circuit; and a data processing circuit;

wherein said transmission packet generation circuit generates a request packet containing a size of data to be transferred when transferring the data of the other node to its own node;

wherein said comparison circuit compares the size of data requested by the request packet and a remaining storage amount in the storage device; and wherein the data processing circuit transmits the request packet to the serial interface bus when the result of the comparison of the comparison circuit is that the remaining storage amount in the storage device is larger than the requested size of data and stores at least the data portion of the response packet in the storage device when receiving a response packet with respect to the request packet from the other node.

10. A serial interface circuit for performing transmission and reception of an asynchronous packet between its own node and another node connected to its own node via a serial interface bus, comprising:

a first storage device;

a second storage device;

a transmission packet generation circuit coupled to the first storage device;

a comparison circuit arranged to receive outputs from the second storage device and the transmission packet generation circuit; and a data processing circuit;

wherein the transmission packet generation circuit generates a request packet containing a size of data to be transferred and causes the same to be stored in the first storage device when transferring the data of the other node to its own node;

wherein the comparison circuit compares the size of data requested by the request packet and a remaining storage amount in the second storage device; and wherein the data processing circuit transmits the request packet to the serial interface bus when the result of the comparison of the comparison circuit is that the remaining storage amount in the second storage device is larger than the requested size of data and stores at least the data portion of the response packet in the second storage device when receiving a response packet with respect to the request packet from the other node.

11. A serial interface circuit for performing transmission and reception of an asynchronous packet between its own node and another node connected to its own node via a serial interface bus, comprising:

a storage device;

a transmission packet generation circuit;

a comparison circuit arranged to receive outputs from the storage device and the transmission packet generation circuit; and a data processing circuit;

wherein said transmission packet generation circuit generates a request packet containing a size of data to be transferred when transferring the data of the other node to its own node;

wherein said comparison circuit compares the size of data requested by the request packet and a remaining storage amount in the storage device;

wherein the data processing circuit transmits the request packet to the serial interface bus when the result of the comparison of the comparison circuit is that the remaining storage amount in the storage device is larger than the requested size of data and stores at least the data portion of the response packet in the storage device when receiving a response packet with respect to the request packet from the other node, and wherein the transmission packet generation circuit, when transferring data of the other node to its own node, generates a plurality of request packets containing the size of data to be transferred and transmits the same to the serial interface bus to enable transfer of the data in packets.

12. A serial interface circuit for performing transmission and reception of an asynchronous packet between its own node and another node connected to its own node via a serial interface bus, comprising:

a first storage device;

a second storage device;

a transmission packet generation circuit coupled to the first storage device;

a comparison circuit arranged to receive outputs from the second storage device and the transmission packet generation circuit; and a data processing circuit;

wherein the transmission packet generation circuit generates a request packet containing a size of data to be transferred and causes the same to be stored in the first storage device when transferring the data of the other node to its own node;

wherein the comparison circuit compares the size of data requested by the request packet and a remaining storage amount in the second storage device;

wherein the data processing circuit transmits the request packet to the serial interface bus when the result of the comparison of the comparison circuit is that the remaining storage amount in the second storage device is larger than the requested size of data and stores at least the data portion of the response packet in the second storage device when receiving a response packet with respect to the request packet from the other node, and wherein the transmission packet generation circuit, when transferring data of the other node to its own node, generates a plurality of request packets containing the size of data to be transferred and transmits the same to the serial interface bus to enable transfer of the data in packets.

13. A serial interface circuit for performing transmission and reception of an asynchronous packet between its own node and another node connected to its own node via a serial interface bus, comprising:

a storage device;

a transmission packet generation circuit;

a maximum size calculating circuit;

a comparison circuit arranged to receive outputs from the storage device and the transmission packet generation circuit; and a data processing circuit;

wherein the transmission packet generation circuit generates a request packet containing a size of data to be transferred when transferring the data of the other node to its own node;

wherein the maximum size calculating circuit obtains a maximum size of data which can be requested by the request packet;

wherein the comparison circuit compares the maximum size of data obtained by the maximum size calculating circuit and a remaining storage amount in the storage device; and Wherein the data processing circuit transmits the request packet to the serial interface bus when the result of the comparison of the comparison circuit is that the remaining storage amount in the storage device is larger than the maximum size of data and stores at least the data portion of the response packet in the storage device when receiving a response packet with respect to the request packet from the other node.

14. A serial interface circuit for performing transmission and reception of an asynchronous packet between its own node and another node connected to its own node via a serial interface bus, comprising:

a first storage device;

a second storage device;

a transmission packet generation circuit coupled to the first storage device;

a maximum size calculating circuit;

a comparison circuit arranged to receive outputs from the second storage device and the transmission packet generation circuit; and a data processing circuit;

wherein the transmission packet generation circuit generates a request packet containing a size of data to be transferred and causes the same to be stored in the first storage device when transferring the data of the other node to its own node;

wherein the maximum size calculating circuit obtains a maximum size of data which can be requested by the request packet;

wherein the comparison circuit compares the maximum size of data obtained by the maximum size calculating circuit and a remaining storage amount in the second storage device; and wherein the data processing circuit transmits the request packet to the serial interface bus when the result of the comparison of the comparison circuit is that the remaining storage amount in the second storage device is larger than the maximum size of data and stores at least the data portion of the response packet in the second storage device when receiving a response packet with respect to the request packet from the other node.

15. A serial interface circuit for performing transmission and reception of an asynchronous packet between its own node and another node connected to its own node via a serial interface bus, comprising:

a storage device;

a transmission packet generation circuit;

a maximum size calculating circuit;

a comparison circuit arranged to receive outputs from the storage device and the transmission packet generation circuit; and a data processing circuit;

wherein the transmission packet generation circuit generates a request packet containing a size of data to be transferred when transferring the data of the other node to its own node;

wherein the maximum size calculating circuit obtains a maximum size of data which can be requested by the request packet;

wherein the comparison circuit compares the maximum size of data obtained by the maximum size calculating circuit and a remaining storage amount in the storage device;

wherein the data processing circuit transmits the request packet to the serial interface bus when the result of the comparison of the comparison circuit is that the remaining storage amount in the storage device is larger than the maximum size of data and stores at least the data portion of the response packet in the storage device when receiving a response packet with respect to the request packet from the other node, and wherein the transmission packet generation circuit, when transferring data of the other node to its own node, generates a plurality of request packets containing the size of data to be transferred and transmits the same to the serial interface bus to enable transfer of the data in packets.

16. A serial interface circuit for performing transmission and reception of an asynchronous packet between its own node and another node connected to its own node via a serial interface bus, comprising:

a first storage device;

a second storage device;

a transmission packet generation circuit coupled to the first storage device;

a maximum size calculating circuit;

a comparison circuit arranged to receive outputs from the second storage device and the transmission packet generation circuit; and a data processing circuit;

wherein the transmission packet generation circuit generates a request packet containing a size of data to be transferred and causes the same to be stored in the first storage device when transferring the data of the other node to its own node;

wherein the maximum size calculating circuit obtains a maximum size of data which can be requested by the request packet;

wherein the comparison circuit compares the maximum size of data obtained by the maximum size calculating circuit and a remaining storage amount in the second storage device;

wherein the data processing circuit transmits the request packet to the serial interface bus when the result of the comparison of the comparison circuit is that the remaining storage amount in the second storage device is larger than the maximum size of data and stores at least the data portion of the response packet in the second storage device when receiving a response packet with respect to the request packet from the other node, and wherein the transmission packet generation circuit, when transferring data of the other node to its own node, generates a plurality of request packets containing the size of data to be transferred and transmits the same to the serial interface bus to enable transfer of the data in packets.

* * * * *